United States Patent
Palombini et al.

(10) Patent No.: US 12,227,097 B2
(45) Date of Patent: *Feb. 18, 2025

(54) ELECTRIC CHARGING STATION FOR AN ELECTRIC VEHICLE AND A METHOD FOR ITS USE

(71) Applicant: BETA AIR, LLC, South Burlington, VT (US)

(72) Inventors: John Charles Palombini, South Burlington, VT (US); Nathan Ward, South Burlington, VT (US); Richard Donnelly, South Burlington, VT (US); Jake Pill, South Burlington, VT (US); Edward Hall, South Burlington, VT (US)

(73) Assignee: BETA Air LLC, South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,064

(22) Filed: Apr. 3, 2023

(65) Prior Publication Data
US 2023/0382250 A1 Nov. 30, 2023

Related U.S. Application Data

(63) Continuation of application No. 17/751,870, filed on May 24, 2022, now Pat. No. 11,654,787.

(51) Int. Cl.
*B60L 53/302* (2019.01)
*B60L 53/18* (2019.01)
(Continued)

(52) U.S. Cl.
CPC ............. *B60L 53/302* (2019.02); *B60L 53/18* (2019.02); *B60L 58/24* (2019.02); *B64F 1/362* (2013.01);
(Continued)

(58) Field of Classification Search
CPC ............................ B60L 53/302; H02J 7/0042
(Continued)

(56) References Cited

U.S. PATENT DOCUMENTS 7,944,667 B2  5/2011  Ouwerkerk
8,098,044 B2  1/2012  Taguchi
(Continued)

FOREIGN PATENT DOCUMENTS

| DE | 102011119495 A1 | 11/2021 |
| DE | 102011119495 B4 | 11/2021 |
| WO | 2019002853 | 1/2019 |

OTHER PUBLICATIONS

By Evtol, Lillum partners with ABB for eVTOL charging infrastructure, Oct. 13, 2021.
(Continued)

*Primary Examiner* — Jack Chiang
*Assistant Examiner* — Suchin Parihar
(74) *Attorney, Agent, or Firm* — Hoffman Warnick LLC

(57) ABSTRACT

In an aspect the current disclosure may describe a electric charging station for an electric vehicle. The electric charging station may include a charging cable, wherein the charging cable is configured to carry electricity and an energy source, wherein the energy source is electrically connected to the charging cable. The charging station may further include a temperature sensor, wherein the temperature sensor is configured to generate temperature datum and a computing device. A computing device may be communicatively connected to the plurality of temperature regulating elements and the temperature sensor. The computing device may further be configured to receive the battery datum and regulate battery temperature and cabin temperature using the plurality of temperature regulating elements as a function of the temperature datum.

20 Claims, 7 Drawing Sheets

(51) Int. Cl.
  *B60L 58/24* (2019.01)
  *B64C 29/00* (2006.01)
  *B64F 1/36* (2024.01)
  *H02J 7/00* (2006.01)

(52) U.S. Cl.
  CPC ......... *H02J 7/0042* (2013.01); *B60L 2200/10* (2013.01); *B64C 29/0008* (2013.01)

(58) Field of Classification Search
  USPC ....................................................... 320/109
  See application file for complete search history.

(56) References Cited

U.S. PATENT DOCUMENTS

| | | | |
|---|---|---|---|
| 8,558,504 | B2 | 10/2013 | Brown et al. |
| 8,737,026 | B2 | 5/2014 | Ueno et al. |
| 9,321,362 | B2 | 4/2016 | Woo et al. |
| 9,421,878 | B2 | 8/2016 | Tremblay et al. |
| 9,490,640 | B2 | 11/2016 | Pham et al. |
| 9,975,443 | B2 | 5/2018 | Jefferies et al. |
| 10,207,589 | B2 | 2/2019 | Guillermin et al. |
| 10,714,236 | B2 | 7/2020 | Lyon |
| 10,717,367 | B1 * | 7/2020 | Price ........ B60L 53/30 |
| 10,906,417 | B2 | 2/2021 | Alford et al. |
| 11,148,534 | B2 | 10/2021 | Reber et al. |
| 11,654,787 | B1 * | 5/2023 | Palombini ........... B60L 53/53 320/109 |
| 2004/0100225 | A1 | 5/2004 | Neil et al. |
| 2010/0013433 | A1 | 1/2010 | Baxter et al. |
| 2012/0041855 | A1 | 2/2012 | Sterling et al. |
| 2014/0062698 | A1 | 3/2014 | Fawcett |
| 2014/0106586 | A1 | 4/2014 | Boeck et al. |
| 2014/0111158 | A1 | 4/2014 | Kinomura et al. |
| 2016/0264010 | A1 | 9/2016 | Boyer et al. |
| 2017/0327091 | A1 | 11/2017 | Capizzo |
| 2017/0361719 | A1 | 12/2017 | Doucet et al. |
| 2020/0083701 | A1 | 3/2020 | Myer et al. |
| 2020/0301448 | A1 | 9/2020 | Di Benedetto et al. |
| 2020/0303788 | A1 | 9/2020 | Rheaume |
| 2021/0284357 | A1 | 9/2021 | Villa et al. |
| 2022/0016990 | A1 * | 1/2022 | Epstein ............ H04L 9/50 |
| 2022/0263148 | A1 * | 8/2022 | Ahunai ............ H01M 10/625 |
| 2024/0075829 | A1 * | 3/2024 | Rowland ............ B60L 53/37 |
| 2024/0162730 | A1 * | 5/2024 | Armstrong .......... B64U 80/25 |

OTHER PUBLICATIONS

By Evtol, Eve partners with EDP to study eVTOL charging infrastructure, Jul. 15, 2021.
Eric Adams, A Rest Stop Where Flying Cars Can Recharge, Mar. 29, 2020.

* cited by examiner

ELECTRIC CHARGING STATION FOR AN ELECTRIC VEHICLE AND A METHOD FOR ITS USE

CROSS-REFERENCE TO RELATED APPLICATIONS

This application is a continuation of Non-provisional application Ser. No. 17/751,870 filed on May 24, 2022 and entitled "ELECTRIC CHARGING STATION FOR AN ELECTRIC VEHICLE AND A METHOD FOR ITS USE," the entirety of which is incorporated herein by reference.

FIELD OF THE INVENTION

The present invention generally relates to the field of electric vehicle charging. In particular, the present invention is directed to an electric charging station for an electric vehicle.

BACKGROUND

When charging an electric aircraft, easy to use charging systems are important. Messy cable solution may cause frustration and lost time, decreasing the appeal of electric aircraft. Furthermore, having to manually pay in or out the charging cable from a charging system waste time and creates additional hassle. Existing solutions are not satisfactory.

SUMMARY OF THE DISCLOSURE

In an aspect the current disclosure may describe an electric charging station for an electric aircraft. The electric charging station may include a charging connector, wherein the charging connector is configured to couple with an electric vehicle port of an electric aircraft for charging a battery of the electric aircraft, a charging cable electrically connected to the charging connector, wherein the charging cable is configured to carry electricity, and an energy source, wherein the energy source is electrically connected to the charging cable. The electric charging station may further include a first fluidic connector, wherein the first fluidic connector is configured to couple with at least an electric vehicle port, a battery temperature regulating element thermally connected to at least a battery of the electric aircraft through the at least an electric aircraft vehicle port and comprising at least a coolant flow path, and a coolant temperature sensor, wherein the coolant temperature sensor is configured to generate a coolant temperature datum as a function of a coolant temperature. The electric charging station may further include a computing device communicatively connected to the temperature regulating element and the coolant temperature sensor, wherein the computing device is configured to receive the coolant temperature datum from the coolant temperature sensor, regulate the coolant temperature, and modify a battery temperature of a battery of the electric aircraft using the battery temperature regulating element as a function of coolant flow.

In another aspect, a method of use of an electric charging station for an electric aircraft is described. The method may include coupling a charging connector with an electric vehicle port of an electric aircraft for charging a battery of the electric aircraft, charging, using a charging cable electrically connected to an energy source and the battery of the electric aircraft, wherein the charging cable is configured to carry electricity, coupling a first fluidic connector to at least an electric vehicle port and generating, using a coolant temperature sensor, a coolant temperature datum as a function of a coolant temperature. The method may further include receiving, using a computing device, the coolant temperature datum from the coolant temperature sensor, regulating, using the computing device, the coolant temperature datum, and modifying, using the computing device, a battery temperature of a battery of the electric aircraft with the battery temperature regulating element as a function of coolant flow.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed an electric charging station for an electric vehicle. In an embodiment, the electric charging station may include a charging cable, wherein the charging cable is configured to carry electricity and an energy source, wherein the energy source is electrically connected to the charging cable. The charging station may further include a temperature sensor, wherein the temperature sensor is configured to generate temperature datum and a computing device. A computing device may be communicatively connected to the plurality of temperature regulating elements and the temperature sensor. The computing device may further be configured to receive the battery datum and regulate battery temperature and cabin temperature using the plurality of temperature regulating elements as a function of the temperature datum. Exemplary embodiments illustrating aspects of the present disclosure are described below in the context of several specific examples.

Figure 1:
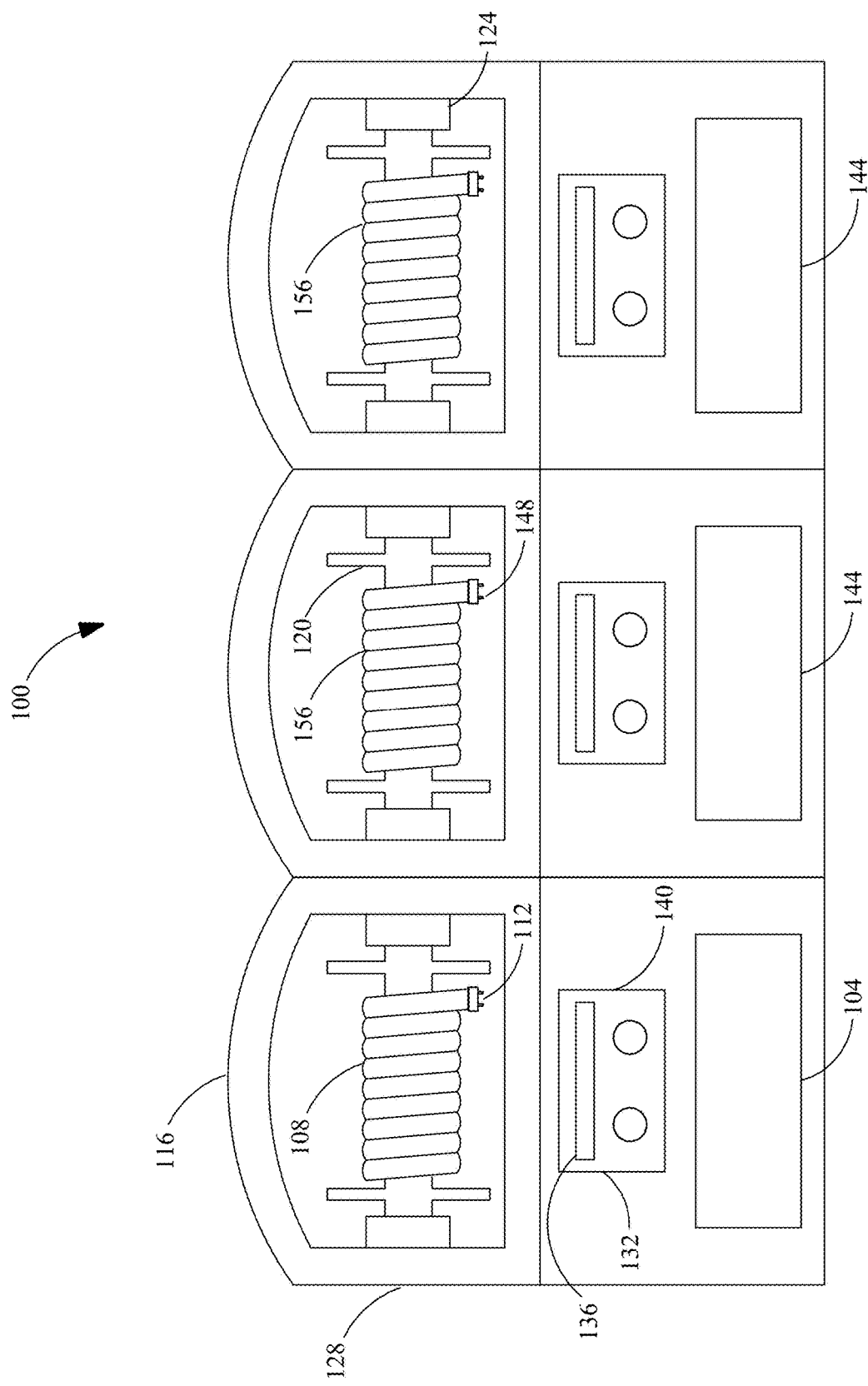
FIG. 1 is a diagram illustrating an electric charging station for an electric vehicle.

Referring now to FIG. 1, an embodiment of an electric aircraft charging station 100 is shown. Charging station 100 includes an energy source 104. An "energy source," for the purposes of this disclosure, is a source of electrical power. In some embodiments, energy source 104 may be an energy storage device, such as, for example, a battery or a plurality of batteries. A battery may include, without limitation, a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries, such as, without limitation, lead acid batteries, metal-air batteries, or any other suitable battery. Additionally, energy source 104 need not be made up of only a single electrochemical cell; it can consist of several electrochemical cells wired in series or in parallel. In other embodiments, energy source 104 may be a connection to the power grid. For example, in some non-limiting embodiments, energy source 104 may include a connection to a grid power component. The grid power component may be connected to an external electrical power grid. In some other embodiments, the external power grid may be used to charge batteries, for example, when energy source 104 includes batteries. In some embodiments, the grid power component may be configured to slowly charge one or more batteries in order to reduce strain on nearby electrical power grids. In one embodiment, the grid power component may have an AC grid current of at least 450 amps. In some embodiments, the grid power component may have an AC grid current of more or less than 450 amps. In one embodiment, the grid power component may have an AC voltage connection of 480 VAC. In other embodiments, grid power component may have an AC voltage connection of above or below 480 VAC. Some components of charging station 100 may be consistent with the charger disclosed in U.S. application Ser. No. 17/477,987 filed on Sep. 17, 2021, titled "Systems and Methods for Adaptive Electric aircraft," the entirety of which is hereby incorporated by reference. Additionally, some components of charging station 100 may be consistent with the charger disclosed in U.S. application Ser. No. 17/515,448 filed on Oct. 30, 2021, titled "SYSTEMS AND METHODS FOR AN IMMEDIATE SHUTDOWN OF AN ELECTRIC VEHICLE CHARGER," the entirety of which is hereby incorporated by reference.

With continued reference to FIG. 1, charging station 100 may include a charging cable 108. A "charging cable," for the purposes of this disclosure is a conductor or conductors adapted to carry power for the purpose of charging an electronic device. Charging cable 108 is configured to carry electricity. Charging cable 108 is electrically connected to the energy source 104. "Electrically connected," for the purposes of this disclosure, means a connection such that electricity can be transferred over the connection. In some embodiments, charging cable 108 may carry AC and/or DC power to a charging connector 112. The charging cable may include a coating, wherein the coating surrounds the conductor or conductors of charging cable 108. One of ordinary skill in the art, after having reviewed the entirety of this disclosure, would appreciate that a variety of coatings are suitable for use in charging cable 108. As a non-limiting example, the coating of charging cable 108 may comprise rubber. As another non-limiting example, the coating of charging cable 108 may comprise nylon. Charging cable 108 may be a variety of lengths depending on the length required by the specific implementation. As a non-limiting example, charging cable 108 may be 10 feet. As another non-limiting example, charging cable 108 may be 25 feet. As yet another non-limiting example, charging cable 108 may be 50 feet.

With continued reference to FIG. 1, charging station 100 may include a charging connector 112. Charging cable 108 may be electrically connected to charging connector 112. Charging connector 112 may be disposed at one end of charging cable 108. Charging connector 112 may be configured to couple with a corresponding charging port on an electric aircraft. For the purposes of this disclosure, a "charging connector" is a device adapted to electrically connect a device to be charged with an energy source. For the purposes of this disclosure, a "charging port" is a section on a device to be charged, arranged to receive a charging connector.

With continued reference to FIG. 1, charging connector 112 may include a variety of pins adapted to mate with a charging port disposed on an electric aircraft. The variety of pins included on charging connector 112 may include, as non-limiting examples, a set of pins chosen from an alternating current (AC) pin, a direct current (DC) pin, a ground pin, a communication pin, a sensor pin, a proximity pin, and the like. In some embodiments, charging connector 112 may include more than one of one of the types of pins mentioned above.

With continued reference to FIG. 1, for the purposes of this disclosure, a "pin" may be any type of electrical connector. An electrical connector is a device used to join electrical conductors to create a circuit. As a non-limiting example, in some embodiments, any pin of charging connector 112 may be the male component of a pin and socket connector. In other embodiments, any pin of charging connector 112 may be the female component of a pin and socket connector. As a further example of an embodiment, a pin may have a keying component. A keying component is a part of an electrical connector that prevents the electrical connector components from mating in an incorrect orientation. As a non-limiting example, this can be accomplished by making the male and female components of an electrical connector asymmetrical. Additionally, in some embodiments, a pin, or multiple pins, of charging connector 112 may include a locking mechanism. For instance, as a non-limiting example, any pin of charging connector 112 may include a locking mechanism to lock the pins in place. The pin or pins of charging connector 112 may each be any type of the various types of electrical connectors disclosed above, or they could all be the same type of electrical connector. One of ordinary skill in the art, after reviewing the entirety of this disclosure, would understand that a wide variety of electrical connectors may be suitable for this application.

With continued reference to FIG. 1, in some embodiments, charging connector 112 may include a DC pin, which supplies DC power. "DC power," for the purposes of this disclosure refers, to a one-directional flow of charge. For example, in some embodiments, the DC pin may supply power with a constant current and voltage. As another example, in other embodiments, the DC pin may supply power with varying current and voltage, or varying current constant voltage, or constant current varying voltage. In another embodiment, when charging connector is charging certain types of batteries, the DC pin may support a varied charge pattern. This involves varying the voltage or current supplied during the charging process in order to reduce or minimize battery degradation. Examples of DC power flow include half-wave rectified voltage, full-wave rectified voltage, voltage supplied from a battery or other DC switching power source, a DC converter such as a buck or boost converter, voltage supplied from a DC dynamo or other generator, voltage from photovoltaic panels, voltage output by fuel cells, or the like.

With continued reference to FIG. 1, in some embodiments, charging connector 112 may include an AC pin. An AC pin supplies AC power. For the purposes of this disclosure, "AC power" refers to electrical power provided with a bi-directional flow of charge, where the flow of charge is periodically reversed. The AC pin may supply AC power at a variety of frequencies. For example, in a non-limiting embodiment, the AC pin may supply AC power with a frequency of 50 Hz. In another non-limiting embodiment, the AC pin may supply AC power with a frequency of 60 Hz. One of ordinary skill in the art, upon reviewing the entirety of this disclosure, would realize that the AC pin may supply a wide variety of frequencies. AC power produces a waveform when it is plotted out on a current vs. time or voltage vs. time graph. In some embodiments, the waveform of the AC power supplied by the AC pin may be a sine wave. In other embodiments, the waveform of the AC power supplied by the AC pin may be a square wave. In some embodiments, the waveform of the AC power supplied by the AC pin may be a triangle wave. In yet other embodiments, the waveform of the AC power supplied by AC pin may be a sawtooth wave. The AC power supplied by the AC pin may, in general have any waveform, so long as the wave form produces a bi-directional flow of charge. AC power may be provided without limitation, from alternating current generators, "mains" power provided over an AC power network from power plants, AC power output by AC voltage converters including transformer-based converters, and/or AC power output by inverters that convert DC power, as described above, into AC power. For the purposes of this disclosure, "supply," "supplies," "supplying," and the like, include both currently supplying and capable of supplying. For example, a live pin that "supplies" DC power need not be currently supplying DC power, it can also be capable of supplying DC power.

With continued reference to FIG. 1, in some embodiments, charging connector 112 may include a ground pin. A ground pin is an electronic connector that is connected to ground. For the purpose of this disclosure, "ground" is the reference point from which all voltages for a circuit are measured. "Ground" can include both a connection the earth, or a chassis ground, where all of the metallic parts in a device are electrically connected together. In some embodiments, "ground" can be a floating ground. Ground may alternatively or additionally refer to a "common" channel or "return" channel in some electronic systems. For instance, a chassis ground may be a floating ground when the potential is not equal to earth ground. In some embodiments, a negative pole in a DC circuit may be grounded. A "grounded connection," for the purposes of this disclosure, is an electrical connection to "ground." A circuit may be grounded in order to increase safety in the event that a fault develops, to absorb and reduce static charge, and the like. Speaking generally, a grounded connection allows electricity to pass through the grounded connection to ground instead of through, for example, a human that has come into contact with the circuit. Additionally, grounding a circuit helps to stabilize voltages within the circuit.

With continued reference to FIG. 1, in some embodiments, charging connector 112 may include a communication pin. A communication pin is an electric connector configured to carry electric signals between components of charging station 100 and components of an electric aircraft. As a non-limiting example, the communication pin may carry signals from a controller in a charging system (e.g. computing device 140) to a controller onboard an electric aircraft such as a flight controller or battery management controller. A person of ordinary skill in the art would recognize, after having reviewed the entirety of this disclosure, that the communication pin could be used to carry a variety of signals between components.

With continued reference to FIG. 1, charging connector 112 may include a variety of additional pins. As a non-limiting example, charging connector 112 may include a proximity detection pin. The proximity detection pin has no current flowing through it when charging connector 112 is not connected to a port. Once charging connector 112 is connected to a port, then the proximity detection pin will have current flowing through it, allowing for the controller to detect, using this current flow, that the charging connector 112 is connected to a port.

With continued reference to FIG. 1, charging station may 100 include multiple connectors. "Connectors" for the purposes of this disclosure are components that facilitate the transfer the of electrical power and/or thermal mediums between a source and an electric aircraft. The connector may be consistent with charging connector 112 described herein. The connector may be configured to couple with at least an electric vehicle port. In some cases, the connector may be configured to couple with a receiving portion of an electric vehicle capable of receiving a thermal medium and/or electricity. The connector may include a charging connector, and/or a fluidic connector. A fluidic connector may facilitate the transfer of a thermal medium, such as coolant described herein, between a coolant source and an electric aircraft. In some cases, the connector may include more than one fluidic connector such as a first fluidic connector and a second fluidic connector. A fluidic connector may include a temperature regulating element as described in this disclosure. In some cases, the charging station may contain multiple fluidic connectors wherein each fluidic connector may contain a temperature regulating element. In some cases, the temperature regulating element may be mechanically coupled to fluidic connector to facilitate the transfer of a thermal medium, such as coolant, within the temperature regulating element and an electric vehicle. In some cases, a first fluidic connector may be mechanically coupled to a battery temperature regulating element, wherein the battery temperature regulating element is configured to provide a thermal medium to a battery of an electric aircraft. In some cases, the battery temperature regulating element may be thermally connected to at least a battery of the electric vehicle through at least an electric vehicle port. In some cases, the fluidic connector may facilitate the transfer of a thermal medium through the electric aircraft port. In some cases, the battery temperature regulating element may contain a coolant. The battery temperature regulating element may be consistent with the temperature regulating element described herein. In some cases, the battery temperature regulating element may modify a battery temperature of a battery or electric aircraft as a function of coolant flow. In some cases, coolant flow may control the temperature of a battery wherein the rate of a coolant may facilitate heat transfer between the coolant and the battery. In some cases, the fluidic connector may include a cabin temperature regulating element, wherein the cabin temperature regulating element is configured to regulate the temperature within a cabin. In some cases, the cabin temperature regulating element include the battery temperature regulating element. In some cases, the regulating elements described herein are separate and distinct. In some cases, a second fluidic connector may also be mechanically coupled to the cabin temperature regulating element, wherein the second fluidic connector may facilitate the transfer of a thermal medium within the cabin temperature regulating element and an electric aircraft. In some cases, the connector and/or the fluidic connector may be consistent with flexible duct hose. In some cases, the connector and/or the fluidic connector may be consistent with a cable reel module as described herein.

With continued reference to FIG. 1, charging station 100 may include a cable reel module 116. The cable reel module 116 including a reel 120. For the purposes of this disclosure, "a cable reel module" is the portion of a charging system containing a reel, that houses a charging cable or a temperature regulating element when the charging cable is stowed. For the purposes of this disclosure, a "reel" is a rotary device around which an object may be wrapped. Reel 120 is rotatably mounted to cable reel module 116. For the purposes of this disclosure, "rotatably mounted" means mounted such that the mounted object may rotate with respect to the object that the mounted object is mounted on. Additionally, when charging cable 108 is in a stowed configuration, charging cable 108 is wound around reel 120. As a non-limiting example, charging cable 108 is in the stowed configuration in FIG. 1. In the stowed configuration, charging cable 108 need not be completely wound around reel 120. As a non-limiting example, a portion of charging cable 108 may hang free from reel 120 even when charging cable 108 is in the stowed configuration. In some embodiments, a plurality of temperature regulating elements 144 may be located within a cable reel module 116. In embodiments, charging cable 108 may be replaced by a flexible duct hose 156 on the reel. The disclosure of the cable reel module 116 may be consistent with the disclosures of the cable reel module utilized in U.S. Nonprovisional application Ser. No. 17/736,530, filed on May 4, 2022, and entitled "SYSTEM FOR AN ELECTRIC AIRCRAFT CHARGING WITH A CABLE REEL," the entirety of which is incorporated herein by reference.

With continued reference to FIG. 1, cable reel module 116 includes a rotation mechanism 124. A "rotation mechanism," for the purposes of this disclosure is a mechanism that is configured to cause another object to undergo rotary motion. As a non-limiting example, rotation mechanism 124 may include a rotary actuator. As a non-limiting example, rotation mechanism 124 may include an electric motor. As another non-limiting example, rotation mechanism 124 may include a servomotor. As yet another non-limiting example, rotation mechanism 124 may include a stepper motor. In some embodiments, rotation mechanism 124 may include a compliant element. For the purposes of this disclosure, a "compliant element" is an element that creates force through elastic deformation. As a non-limiting example, rotation mechanism 124 may include a torsional spring, wherein the torsional spring may elastically deform when reel 120 is rotated in, for example, the forward direction; this would cause the torsional spring to exert torque on reel 120, causing reel 120 to rotate in a reverse direction when it has been released. Rotation mechanism 124 is configured to rotate reel 120 in a forward direction and a reverse direction. Forward direction and reverse direction are opposite directions of rotation. As a non-limiting example, the forward direction may be clockwise, whereas the reverse direction may be counterclockwise, or vice versa. As a non-limiting example, rotating in the forward direction may cause charging cable 108 to extend, whereas rotating in the reverse direction may cause charging cable 108 to stow, or vice versa. In some embodiments, rotation mechanism 124 may continually rotate reel 120 when rotation mechanism 124 is enabled. In some embodiments, rotation mechanism 124 may be configured to rotate reel 120 by a specific number of degrees. In some embodiments, rotation mechanism 124 may be configured to output a specific torque to reel 120. As a non-limiting example, this may be the case wherein rotation mechanism 124 is a torque motor. Rotation mechanism 124 may be electrically connected to energy source 104.

With continued reference to FIG. 1, a controller may be communicatively connected to rotation mechanism 124. Rotation mechanism 124 may configured to rotate reel 120 in a forward direction and a reverse direction as a function of receiving a signal from controller. The controller, such as computing device 140, may be configured to send an extension signal to rotation mechanism 124. The extension signal may cause rotation mechanism 124 rotate reel 120 in a forward direction. Computing device 140 may also be configured to send a retraction signal to rotation mechanism 124. The retraction signal causes rotation mechanism 124 to rotate reel 120 in a reverse direction. Forward direction and reverse direction may be consistent with any forward direction and reverse direction, respectively, disclosed as part of this disclosure. In some embodiments, the controller may be further configured to send a locking signal to a locking mechanism, wherein the locking signal causes the locking mechanism to enter its engaged state. In some embodiments, the controller may be further configured to send an unlocking signal to locking mechanism. A "controller" for the purposes of this disclosure is any computing device that may be capable of sending and/or receiving a signal. The controller may be consistent with any computing device described herein.

With continued reference to FIG. 1, cable reel module 116 may include an outer case 128. Outer case 128 may enclose reel 120 and rotation mechanism 124. In some embodiments, outer case 128 may enclose charging cable 108 and possibly charging connector 112 when the charging cable 108 is in its stowed configuration.

With continued reference to FIG. 1, charging station 100 may include a control panel 132. For the purposes of this disclosure, a "control panel" is a panel containing a set of controls for a device. Control panel 132 may include a display 136. For the purposes of this disclosure, a "display" is an electronic device for the visual presentation of information. Display 136 may be any type of screen. As non-limiting examples, display 136 may be an LED screen, an LCD screen, an OLED screen, a CRT screen, a DLPT screen, a plasma screen, a cold cathode display, a heated cathode display, a nixie tube display, and the like. Display 136 may be configured to display any relevant information. A person of ordinary skill in the art would appreciate, after having reviewed the entirety of this disclosure, that a variety of information could be displayed on display 136. In some embodiments, display 136 may display metrics associated with the charging of an electric aircraft. As a non-limiting example, this may include energy transferred. As another non-limiting example, this may include charge time remaining. As another non-limiting example, this may include charge time elapsed.

Still referring now to FIG. 1, an exemplary embodiment of a charging station 100 is illustrated, which can include computing device 140. computing device 140 may include any computing device as described in this disclosure, including without limitation a microcontroller, microprocessor, digital signal processor (DSP) and/or system on a chip (SoC) as described in this disclosure. Computing device 140 may include, be included in, and/or communicate with a mobile device such as a mobile telephone or smartphone. computing device 140 may include a single computing device operating independently, or may include two or more computing device operating in concert, in parallel, sequentially, or the like; two or more computing devices may be included together in a single computing device or in two or more computing devices. computing device 140 may interface or communicate with one or more additional devices as described below in further detail via a network interface device. The network interface device may be utilized for connecting computing device 140 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 140 may include but is not limited to, for example, a computing device or cluster of computing devices in a first location and a second computing device or cluster of computing devices in a second location. computing device 140 may include one or more computing devices dedicated to data storage, security, distribution of traffic for load balancing, and the like. computing device 140 may distribute one or more computing tasks as described below across a plurality of computing devices of computing device 140, which may operate in parallel, in series, redundantly, or in any other manner used for distribution of tasks or memory between computing devices. computing device 140 may be implemented using a "shared nothing" architecture in which data is cached at the worker, in an embodiment, this may enable scalability of charging station 100 and/or computing device 140.

With continued reference to FIG. 1, computing device 140 may be designed and/or configured to perform any method, method step, or sequence of method steps in any embodiment described in this disclosure, in any order and with any degree of repetition. For instance, computing device 140 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 140 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 140 may be configured to determine the target temperature of the battery. As used in this disclosure, "target temperature" is an ideal or otherwise preset temperature of a battery or cabin; target temperature may be calculated based on a culmination one or more factors such as weather, flight mode, altitude, external temperature, and the like. In some embodiments, computing device 140 may be configured to generate the target temperature as a function of the flight plan. As used in the current disclosure, a "flight plan" is a plan to get the aircraft from its departure point to it arrival point in the most efficient manner with respect to flight duration, payload size, aircraft identity, and the like. In a non-limiting, example the target temperature of the battery may adjust based on the duration of the flight or the payload size. Target temperature may allow for a larger or smaller range of temperature for flights that are more strenuous on the battery according to the flight plan.

With continued reference to FIG. 1, computing device 140 may be configured to determine the target temperature of the battery or cabin as a function of battery considerations. Battery considerations may include status of charge of the battery, the number of battery modules, and overall battery health. In embodiments, computing device 140 may calculate target temperature as a function of a location of a charging station as it relates to of a current charge of the battery. In other embodiments, target temperature of the battery may be calculated based on health of the battery adjusting for suboptimal battery health. Target temperature may also be calculated based on a number of battery modules adjusting for heat each battery produces.

With continued reference to FIG. 1, temperature regulating elements 144 may be configured regulate the temperature of the battery cells or cabin. As used in the current disclosure, "regulating the temperature" means managing increase or decrease of the temperature of the battery. Temperature regulation also includes getting to and then maintaining a target temperature. Sensor feedback may be used in this process, whereas the sensor is used as a thermostat.

With continued reference to FIG. 1, computing device 140 may be configured to determine the target temperature of the battery as a function of weather. As used in this disclosure, "weather" is defined as the state of the atmosphere at a place and time as regards temperature, coolness, heat, dryness, sunshine, wind, snow, hail, rain, and the like. Weather may also include but is not limited to ambient temperature, average temperature at different altitudes, wind speed, humidity, etc. As used in the current disclosure, "weather datum" is the datum that is used to calculate the weather at a given time such as wind speed, humidity, temperature at a given altitude, temperature on the ground, and the like. In some embodiments, weather maybe calculated outside the system then communicated to computing device 140. In some embodiments, the weather datum bay be transmitted to computing device 140 by a remote device. In other embodiments, computing device 140 derives the weather as a function of the weather datum. The weather datum may be detected through the use of one or more sensors communicatively connected to a computing device. The various weather events may cause the battery temperature to heat or cool accordingly. Changes in a target temperature may reflect the changes in the weather in order to maintain the ideal temperature of the battery.

With continued reference to FIG. 1, computing device 140 may be configured to calculate the target temperature of the battery as a function of the weather using an equation. As used in the current disclosure, an "equation" is a mathematical formula that will take into account at least the current temperature of the battery and the weather to output the target temperature of the battery. In some embodiments.

With continued reference to FIG. 1, computing device 140 may be configured to calculate the target temperature of the battery as a function of the weather using a machine learning process. A machine-learning module may perform determinations, classification, and/or analysis steps, methods, processes, or the like as described in this disclosure using machine learning processes. A "machine learning process," as used in this disclosure, is a process that automatedly uses training data to generate an algorithm that will be performed by a computing device/module to produce a preflight battery temperature given data provided as inputs. As used in the current disclosure, "training data" is data containing correlations that a machine-learning process may use to model relationships between two or more categories of data. In some embodiments, the inputs into the machine learning process are weather datum and the output of the process is the target temperature of the battery. In a non-limiting example, training data that may be correlated include destinations, weather datum, flight plan data, weather, and the like. In some embodiments, training data may include recorded previous flights where batteries acted within an optimal range, did not require modifications to the flight plan due to temperature issues, and did not exceed or drop below a desired temperature range. In some embodiments, training data may be generated via electronic communication between a computing device and a plurality of sensors. In other embodiments, training data may be communicated to a machine learning model from a remote device. Once the flight plan machine learning process receives training data, it may be implemented in any manner suitable for generation of receipt, implementation, or generation of machine learning.

With continued reference to FIG. 1, computing device 140 may be configured to calculate the target temperature of the battery as a function of the weather using a database. The database may be implemented, without limitation, as a relational database, a key-value retrieval database such as a NOSQL database, or any other format or structure for use as a database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in the database may be flagged with or linked to one or more additional elements of information, which may be reflected in data entry cells and/or in linked tables, such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. In some embodiments, weather datum may be used a query to retrieve the target temperature of the battery.

With continued reference to FIG. 1, a computing device 140 may be configured to command temperature regulating elements 144 to maintain the temperature of the plurality of battery cells. In embodiments, computing device 140 will be communicatively connected with temperature regulating elements. Computing device 140 may command the temperature regulating elements to heat or cool the battery as needed as a function of the target temperature with the goal of maintaining the target temperature of the battery.

With continued reference to FIG. 1, charging station 100 may include a plurality of temperature regulating elements 144. As used in the current disclosure, a "temperature regulating element" is any device configured to maintain the target temperature of the battery or cabin through the use of heating and/or cooling elements. In a non-limiting embodiment, temperature regulating element 144 may be one or any combination of include heat exchangers, heaters, coolers, air conditioners, sheet heaters, and the like. In other embodiments, materials with high or low thermal conductivity, insulators, and convective fluid flows may be used to regulate the temperature of the battery. In a nonlimiting example, temperature regulating elements 144 may be located in gaps between the battery cells. Temperature may be applied to the aircraft using a flexible duct hose 156. As used in the current disclosure, a "flexible duct hose" is a flexible cylindrical hose that that is tailored to allow hot or cold air to pass through it to facilitate heating or cooling from temperature regulating elements 144. Flexible duct hose 156 may also be configured to allow coolant, materials with high or low thermal conductivity, insulators, and convective fluid flows to be used to regulate the temperature of the battery to flow through them. In some cases, the flexible duct hose may include a collapsible duct hose. A "collapsible duct hose" for the purposes of this disclosure is a hose that may expand and contract. The collapsible duct hose may expand in use wherein a fluid or a medium traveling within the collapsible duct hose may cause the hose to expand. In some cases, the absence of a thermal medium within the collapsible duct hose may cause the collapsible duct hose to retract. In some cases, the collapsible duct hose may allow for easy storage. In some cases, the collapsible duct hose may be consistent with a fire hose.

With continued reference to FIG. 1, temperature regulating element 144 may include a heating element. As used in the current disclosure, a "heating element" is a device used to raise the temperature of the battery or cabin. In a non-limiting example, heating elements may include sheet heaters, heat exchangers, heaters, and the like. In an embodiment, a heating element may blow heated air into the cabin or the battery to maintain the target temperature. As used in the current disclosure, "sheet heaters" may include any heating element that is thin and flexible such as to be wrapped around a battery cell, inserted between two battery cells, or the like. Examples of sheet heaters include but are not limited to thick film heaters, sheets of resistive heaters, a heating pad, heating film. heating blanket, and the like. In embodiments, sheet heaters may be wrapped around a battery cell. Sheet heaters may also be placed in the gaps between the battery cells.

With continued reference to FIG. 1, temperature regulating element 144 may include a cooling element. As used in the current disclosure, a "cooling element" is a device used to lower the temperature of the battery or cabin. In an embodiment, a cooling element may include a fan, air conditioner, the use of coolant, heat exchangers. Cool air may be forced into the cabin or battery as a function of the target temperature.

With continued reference to FIG. 1, flexible duct hose 156 may include a Coolant flow path. In some embodiments, the coolant flow path may have a distal end located substantially at charging connector 112. As used in this disclosure, a "coolant flow path" is a component that is substantially impermeable to a coolant and contains and/or directs a coolant flow. As used in this disclosure, "coolant" is any flowable heat transfer medium. The coolant may include a liquid, a gas, a solid, and/or a fluid. The coolant may include a compressible fluid and/or a non-compressible fluid.

The coolant may include a non-electrically conductive liquid such as a fluorocarbon-based fluid, such as without limitation Fluorinert™ from 3M of Saint Paul, Minnesota, USA. In some cases, the coolant may include air. As used in this disclosure, a "flow of coolant" is a stream of coolant. In some cases, the coolant may include a fluid and coolant flow is a fluid flow. Alternatively or additionally, in some cases, the coolant may include a solid (e.g., bulk material) and coolant flow may include motion of the solid. Exemplary forms of mechanical motion for bulk materials include fluidized flow, augers, conveyors, slumping, sliding, rolling, and the like. The coolant flow path may be in fluidic communication with a coolant source. As used in this disclosure, a "coolant source" is an origin, generator, reservoir, or flow producer of coolant. In some cases, a Coolant source may include a flow producer, such as a fan and/or a pump. The coolant source may include any of following non-limiting examples; air conditioner, refrigerator, heat exchanger, pump, fan, expansion valve, and the like.

Still referring to FIG. 1, in some embodiments, the coolant source may be further configured to transfer heat between coolants, for example coolant belonging to coolant flow, and an ambient air. As used in this disclosure, "ambient air" is air which is proximal a system and/or subsystem, for instance the air in an environment which a system and/or sub-system is operating. For example, in some cases, the coolant source comprises a heat transfer device between the coolant and ambient air. Exemplary heat transfer devices include, without limitation, chillers, Peltier junctions, heat pumps, refrigeration, air conditioning, expansion or throttle valves, heat exchangers (air-to-air heat exchangers, air-to-liquid heat exchangers, shell-tube heat exchangers, and the like), vapor-compression cycle systems, vapor absorption cycle systems, gas cycle system, Stirling engines, reverse Carnot cycle systems, and the like. In some versions, computing device 140 may be further configured to control a temperature of the coolant. For instance, in some cases, a sensor may be located within thermal communication with the coolant, such that the sensor is able to detect, measure, or otherwise quantify temperature of the coolant within a certain acceptable level of precision. In some cases, the sensor may include a thermometer. Exemplary thermometers include without limitation, pyrometers, infrared non-contacting thermometers, thermistors, thermocouples, and the like. In some cases, thermometer may transduce coolant temperature to a coolant temperature signal and transmit the coolant temperature signal to computing device 140. Computing device 140 may receive the coolant temperature signal and control heat transfer between ambient air and the coolant as a function of the coolant temperature signal. Computing device 140 may use any control method and/or algorithm used in this disclosure to control heat transfer, including without limitation proportional control, proportional-integral control, proportional-integral-derivative control, and the like. In some cases, computing device 140 may be further configured to control temperature of the coolant within a temperature range below an ambient air temperature. As used in this disclosure, an "ambient air temperature" is temperature of an ambient air. An exemplary non-limiting temperature range below ambient air temperature is about −5° C. to about −30° C. In some embodiments, coolant flow may substantially be comprised of air. In some cases, coolant flow may have a rate within a specified range. A non-limiting exemplary coolant flow range may be about 0.1 CFM and about 100 CFM. In some cases, rate of coolant flow may be considered as a volumetric flow rate. Alternatively or additionally, rate of coolant flow may be considered as a velocity or flux. In some embodiments, the coolant source may be further configured to transfer heat between a heat source, such as without limitation ambient air or chemical energy, such as by way of combustion, and the coolant, for example coolant flow. In some cases, the coolant source may heat the coolant, for example above ambient air temperature, and/or cool coolant, for example below an ambient air temperature. In some cases, the coolant source may be powered by electricity, such as by way of one or more electric motors.

Alternatively or additionally, the coolant source may be powered by a combustion engine, for example a gasoline powered internal combustion engine. In some cases, the coolant flow may be configured, such that heat transfer is facilitated between the coolant flow and at least a battery, by any methods known and/or described in this disclosure. In some cases, at least a battery may include a plurality of pouch cells. In some cases, heat is transferred between the coolant flow and one or more components of at least a pouch cell, including without limitation electrical tabs, pouch, and the like. In some cases, the coolant flow may be configured to facilitate heat transfer between the coolant flow and at least a conductor of electric vehicle, including without limitation electrical busses within at least a battery. The coolant flow path and a coolant reservoir may be a combination of the coolant flow path and coolant reservoir utilized to in U.S. Nonprovisional application Ser. No. 17/563,383, filed on Dec. 28, 2021, and entitled "SYSTEM FOR BATTER TEMPERATURE MANAGEMENT IN AN ELECTRIC AIRCRAFT," the entirety of which is incorporated herein by reference.

With continued reference to FIG. 1, in some embodiments, at least a sensor 148 is configured to detect collect temperature datum 152 from the battery. For the purposes of this disclosure, "temperature datum" is an electronic signal representing an information and/or a parameter of a detected electrical and/or physical characteristic and/or phenomenon correlated with the temperature within the battery or the cabin of the electric aircraft. Temperature datum may also include a measurement of resistance, current, voltage, moisture, and the current temperature of the battery. Temperature datum 152 may also include information regarding the degradation or failure of the battery cell. In some cases, at least a sensor 148 may include a coolant temperature sensor, wherein the coolant temperature sensor is configured to generate a coolant temperature datum as a function of the coolant temperature. In some cases, at least a sensor 148 may contain more than one sensor wherein a coolant or a first temperature sensor may be configured to generate a coolant temperature datum as a function of a coolant temperature and a second temperature sensor or a second coolant temperature sensor may be configured to generate a second coolant temperature datum representing a second coolant temperature. In some cases a first coolant temperature sensor may be representative of a first coolant temperature and a second coolant temperature sensor may be representative of a second coolant. In some cases, the first coolant temperature may be used to indicate the temperature of a battery on electric aircraft. In some cases, the second coolant temperature may be used to indicate the temperature within a passenger cabin of an electric aircraft.

Still referring to FIG. 1, as used in this disclosure, a "sensor" is a device that is configured to detect a phenomenon and transmit information related to the detection of the phenomenon. For example, in some cases a sensor may transduce a detected phenomenon, such as without limitation, voltage, current, speed, direction, force, torque, resistance, moisture, temperature, pressure, and the like, into a sensed signal. A sensor may include one or more sensors which may be the same, similar, or different. A sensor may include a plurality of sensors which may be the same, similar, or different. A sensor may include one or more sensor suites with sensors in each sensor suite being the same, similar, or different.

Still referring to FIG. 1, sensor(s) 148 may include any number of suitable sensors which may be efficaciously used to detect temperature datum 152. For example, and without limitation, these sensors may include a voltage sensor, current sensor, multimeter, voltmeter, ammeter, electrical current sensor, resistance sensor, impedance sensor, capacitance sensor, a Wheatstone bridge, displacements sensor, vibration sensor, Daly detector, electroscope, electron multiplier, Faraday cup, galvanometer, Hall effect sensor, Hall probe, magnetic sensor, optical sensor, magnetometer, magnetoresistance sensor, MEMS magnetic field sensor, metal detector, planar Hall sensor, thermal sensor, and the like, among others. Sensor(s) 148 may efficaciously include, without limitation, any of the sensors disclosed in the entirety of the present disclosure.

With continued reference to FIG. 1, in some embodiments of charging station 100, sensor 148 may be communicatively connected with a Computing device 140. Sensor 148 may communicate with computing device 140 using an electric connection. Alternatively, sensor 148 may communicate with computing device 140 wirelessly, such as by radio waves, Bluetooth, or Wi-Fi. One of ordinary skill in the art, upon reviewing the entirety of this disclosure, would recognize that a variety of wireless communication technologies are suitable for this application.

With continued reference to FIG. 1, computing device 140 may be communicatively connected with temperature regulating elements 144. Computing device 140 may be configured to receive temperature datum 152 from sensor 148. High/low temperature within the battery cell may be determined by computing device 140 as a function of temperature datum 152. Additionally, computing device 140 may determine high/low temperature within the battery cells by comparing temperature datum 152 to a predetermined value. When computing device 140 receives temperature datum 152 from sensor 148 that indicates high/low temperature within the battery cells, then computing device 140 may send a may send a notification to a user interface signifying that high/low temperature within the battery cells.

Figure 2:
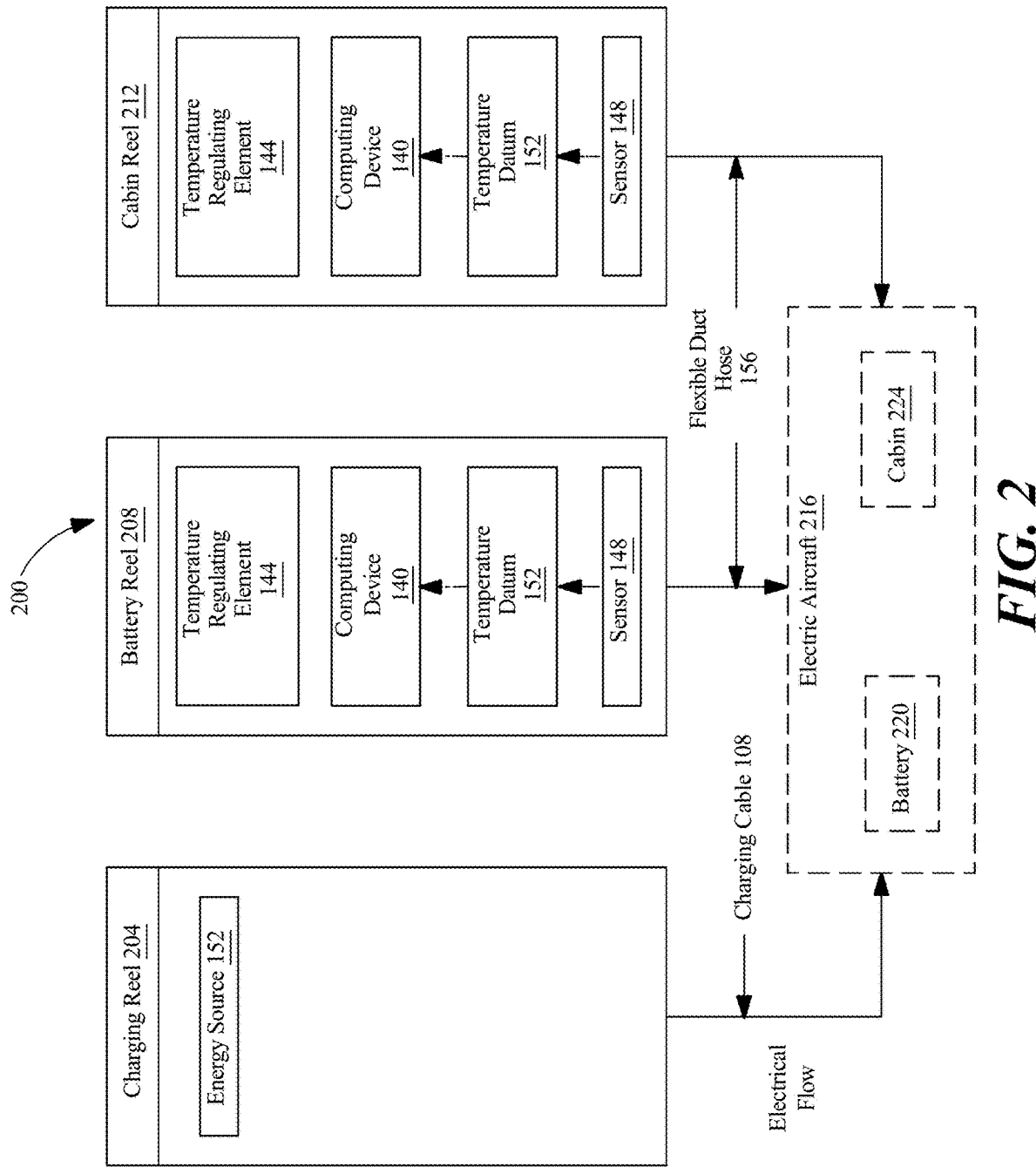
FIG. 2 is a block diagram of an exemplary electric charging station for an electric vehicle.

Referring now to FIG. 2, a block diagram for an exemplary charging station 200 with multiple cable reel modules 116 is shown. Charging station 200 may depict a plurality of cable reel modules a charging reel 204, battery reel 208, and a cabin reel 216. As used in the current disclosure, a "charging reel" may be a cable reel module 116 that is outfitted with equipment that is designed to charge the battery of the electric aircraft. That equipment may include an energy source 152, charging connector 112, and charging cable 108. In some embodiments, the disclosure of charging reel 204 is consistent with the disclosure of cable reel module 116 of FIG. 1.

Still referring to FIG. 2, a block diagram for an exemplary charging station 200 with a battery reel 208. As used in the current disclosure, a "battery reel" may be a cable reel module 116 that is configured to house a temperature regulating element 144. The battery reel 208 may be designed to regulate the temperature of the battery of electric aircraft 216. Battery reel 208 may include a sensor 148, temperature datum 152, a computing device 140, flexible duct hose 156, and a temperature regulating element 144. A temperature sensor within a battery reel may be configured to generate temperature datum regarding the battery 220. Flexible duct hose 156 may be wrapped around the reel of battery reel 208. A flexible duct hose 156 may be mechanically connected to a temperature regulating element.

Still referring to FIG. 2, a block diagram for an exemplary charging station 200 with a cabin reel 212. As used in the current disclosure, a "cabin reel" may be a cable reel module 116 that is configured to house a temperature regulating element 144. Cabin reel 212 may be designed to regulate the temperature of the cabin of electric aircraft 216. Cabin reel 212 may include a sensor 148, temperature datum 152, a computing device 140, flexible duct hose 156, and a temperature regulating element 144. A temperature sensor within cabin reel 212 may be configured to generate temperature datum regarding the cabin 224. Flexible duct hose 156 may be wrapped around the reel of cabin reel 212. Flexible duct hose 156 may be mechanically connected to a temperature regulating element. In some embodiments, the disclosure of battery reel 208 and a cabin reel 212 may be consistent with each other.

With continued reference to FIG. 2, the term "electric aircraft," for the purposes of this disclosure, refers to a machine that is able to fly by gaining support from the air and that generates substantially all of its thrust from electricity. As a non-limiting example, electric aircraft 216 may be capable of vertical takeoff and landing (VTOL) or conventional takeoff and landing (CTOL). As another non-limiting example, electric aircraft 216 may be capable of both VTOL and CTOL. As a non-limiting example, electric aircraft 216 may be capable of edgewise flight. As a non-limiting example, electric aircraft 216 may be able to hover. Electric aircraft 216 may include a variety of electric propulsion devices, including, as non-limiting examples, pushers, pullers, lift devices, and the like.

With continued reference to FIG. 2, the term "battery" is used as a collection of cells connected in series or parallel to each other. A battery cell 220 may, when used in conjunction with other cells, may be electrically connected in series, in paralle,l or a combination of series and parallel. Series connection comprises wiring a first terminal of a first cell to a second terminal of a second cell and further configured to comprise a single conductive path for electricity to flow while maintaining the same current (measured in Amperes) through any component in the circuit. A battery cell 220 may use the term "wired", but one of ordinary skill in the art would appreciate that this term is synonymous with "electrically connected", and that there are many ways to couple electrical elements like battery cells together. An example of a connector that do not comprise wires may be prefabricated terminals of a first gender that mate with a second terminal with a second gender. Battery cells 220 may be wired in parallel. Parallel connection comprises wiring a first and second terminal of a first battery cell 220 to a first and second terminal of a second battery cell 220 and further configured to comprise more than one conductive path for electricity to flow while maintaining the same voltage (measured in Volts) across any component in the circuit. Battery cells 220 may be wired in a series-parallel circuit which combines characteristics of the constituent circuit types to this combination circuit. Battery cells 220 may be electrically connected in a virtually unlimited arrangement which may confer onto the system the electrical advantages associated with that arrangement such as high-voltage applications, high-current applications, or the like. In an exemplary embodiment, A battery module comprise 196 battery cells 220 in series and 18 battery cells in parallel. This is, as someone of ordinary skill in the art would appreciate, only an example, and battery module may be configured to have a near limitless arrangement of battery cell 220 configurations.

With continued reference to FIG. 2, a plurality of battery modules may also comprise a side wall which comprises a laminate of a plurality of layers configured to thermally insulate the plurality of battery cells 220 from external components of battery module. Side wall layers may comprise materials which possess characteristics suitable for thermal insulation as described in the entirety of this disclosure like fiberglass, air, iron fibers, polystyrene foam, and thin plastic films, to name a few. The side wall may additionally or alternatively electrically insulate the plurality of battery cells 220 from external components of battery module and the layers of which may comprise polyvinyl chloride (PVC), glass, asbestos, rigid laminate, varnish, resin, paper, Teflon, rubber, and mechanical lamina. A center sheet may be mechanically coupled to the side wall in any manner described in the entirety of this disclosure or otherwise undisclosed methods, alone or in combination. The side wall may comprise a feature for alignment and coupling to center sheet. This feature may comprise a cutout, slots, holes, bosses, ridges, channels, and/or other undisclosed mechanical features, alone or in combination. The plurality of battery module may be a combination of a plurality of battery module utilized to power the electric aircraft. The battery module may include any of the batteries described in U.S. Nonprovisional application Ser. No. 16/948,140, filed on Sep. 4, 2020, and entitled "SYSTEM AND METHOD FOR HIGH ENERGY DENSITY BATTERY MODULE," the entirety of which is incorporated herein by reference.

With continued reference to FIG. 2, the term "cabin," for the purposes of this disclosure, refers to the area within the fuselage of the aircraft where the pilot and passengers are seated. The cabin 224 may also include areas where the payload of the aircraft is stored. Additionally, the cabin 224 of the aircraft may be any enclosed space within the aircraft that is habitable during flight.

Figure 3:
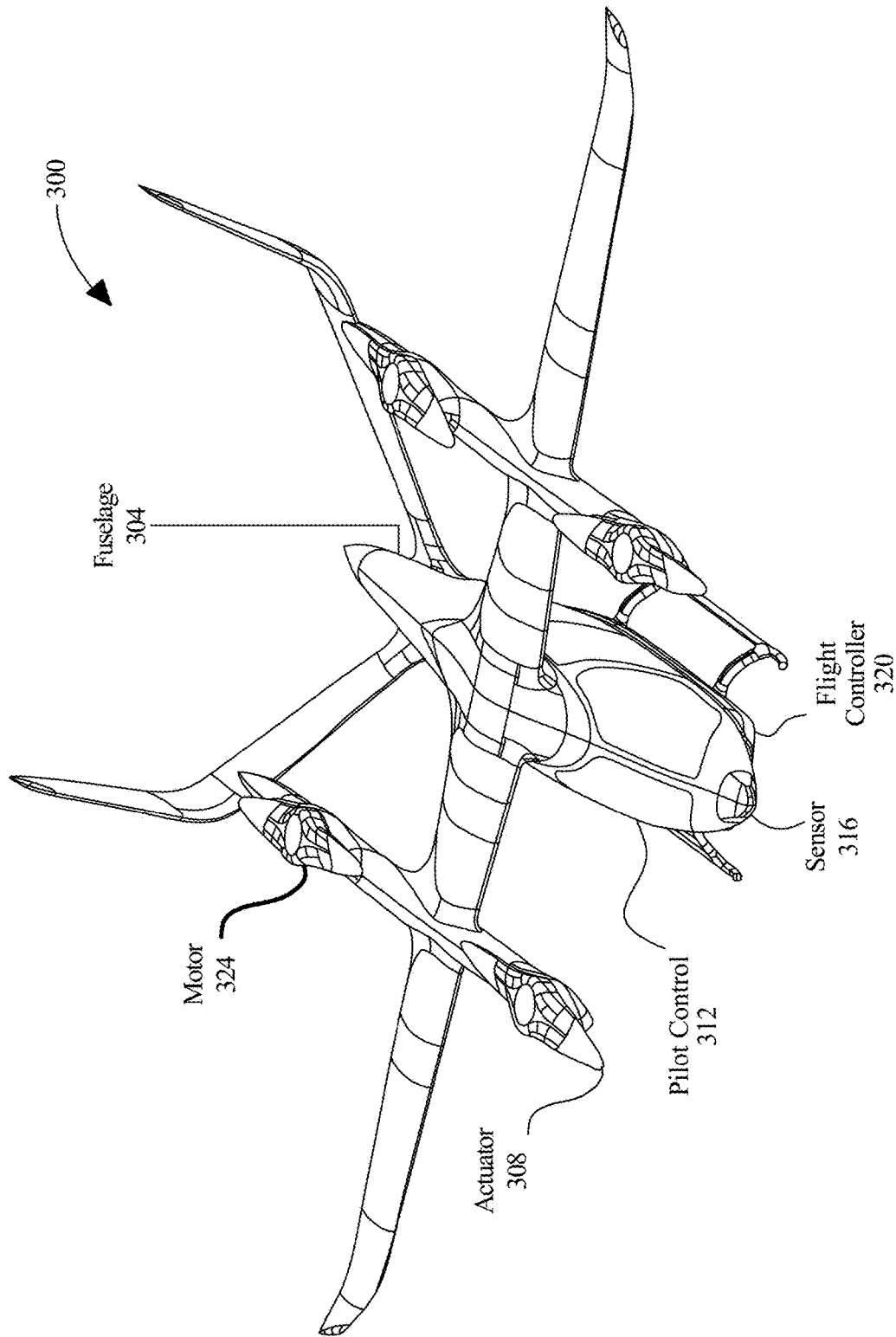
FIG. 3 is a diagram illustrating an exemplary electric aircraft.

Referring now to FIG. 3, an exemplary embodiment of an aircraft 300 is illustrated. Aircraft 300 may include an electrically powered aircraft (i.e., electric aircraft). In some embodiments, electrically powered aircraft 300 may be an electric vertical takeoff and landing (eVTOL) aircraft. Electric aircraft 300 may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generates lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 3, aircraft 300 may include a fuselage 304. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 304 may comprise structural elements that physically support the shape and structure of an aircraft. Structural elements may take a plurality of forms, alone or in combination with other types. Structural elements may vary depending on the construction type of aircraft and specifically, the fuselage. Fuselage 304 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. The aircraft skin may be layered over the body shape constructed by trusses. The aircraft skin may comprise a plurality of materials such as aluminum, fiberglass, and/or carbon fiber, the latter of which will be addressed in greater detail later in this paper.

Still referring to FIG. 3, aircraft 300 may include a plurality of actuators 308. Actuator 308 may include any motor and/or propulsor described in this disclosure, for instance in reference to FIGS. 1-6. In an embodiment, actuator 308 may be mechanically coupled to aircraft 300. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is a vehicle that may fly. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 3, a plurality of actuators 308 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 308 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 308 may include a rudder, which may include, without limitation, a segmented rudder that produces a torque about a vertical axis. Additionally or alternatively, plurality of actuators 308 may include other flight control surfaces such as propulsors, rotating flight controls, or any other structural features which can adjust movement of aircraft 300. Plurality of actuators 308 may include one or more rotors, turbines, ducted fans, paddle wheels, and/or other components configured to propel a vehicle through a fluid medium including, but not limited to air.

Still referring to FIG. 3, plurality of actuators 308 may include at least a propulsor component. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. A propulsor component may include any device or component that consumes electrical power on demand to propel an electric aircraft in a direction or other vehicle while on ground or in-flight. In an embodiment, a propulsor component may include a puller component. As used in this disclosure a "puller component" is a component that pulls and/or tows an aircraft through a medium. As a non-limiting example, a puller component may include a flight component such as a puller propeller, a puller motor, a puller propulsor, and the like. Additionally, or alternatively, a puller component may include a plurality of puller flight components. In another embodiment, a propulsor component may include a pusher component. As used in this disclosure a "pusher component" is a component that pushes and/or thrusts an aircraft through a medium. As a non-limiting example, a pusher component may include a pusher component such as a pusher propeller, a pusher motor, a pusher propulsor, and the like. Additionally, or alternatively, a pusher flight component may include a plurality of pusher flight components.

In another embodiment, and still referring to FIG. 3, a propulsor may include a propeller, a blade, or any combination of the two. A propeller may function to convert rotary motion from an engine or other power source into a swirling slipstream which may push the propeller forwards or backwards. The propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, a propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 3, a propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 3, plurality of actuators 308 may include power sources, control links to one or more elements, fuses, and/or mechanical couplings used to drive and/or control any other flight component. Plurality of actuators 308 may include a motor that operates to move one or more flight control components and/or one or more control surfaces, to drive one or more propulsors, or the like. A motor may be driven by direct current (DC) electric power and may include, without limitation, brushless DC electric motors, switched reluctance motors, induction motors, or any combination thereof. Alternatively or additionally, a motor may be driven by an inverter. A motor may also include electronic speed controllers, inverters, or other components for regulating motor speed, rotation direction, and/or dynamic braking.

Still referring to FIG. 3, plurality of actuators 308 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

In an embodiment, and still referring to FIG. 3, an energy source may be used to provide a steady supply of electrical power to a load over a flight by an electric aircraft 300. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may include an emergency power unit which may be capable of providing sufficient electrical power for auxiliary loads including without limitation, lighting, navigation, communications, de-icing, steering, or other systems requiring power or energy. Further, the energy source may be capable of providing sufficient power for controlled descent and landing protocols, including, without limitation, hovering descent, or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 3, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/948,140 both entitled "SYSTEM AND METHOD FOR HIGH ENERGY DENSITY BATTERY MODULE" by S. Donovan et al., which are incorporated in their entirety herein by reference.

Still referring to FIG. 3, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 3, another exemplary actuator may include landing gear. Landing gear may be used for take-off and/or landing. Landing gear may be used to contact ground while aircraft 300 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 3, aircraft 300 may include a pilot control 312, including without limitation, a hover control, a thrust control, an inceptor stick, a cyclic, and/or a collective control. As used in this disclosure a "collective control" or "collective" is a mechanical control of an aircraft that allows a pilot to adjust and/or control the pitch angle of the plurality of actuators 308. For example and without limitation, collective control may alter and/or adjust the pitch angle of all of the main rotor blades collectively. For example, and without limitation pilot control 312 may include a yoke control. As used in this disclosure a "yoke control" is a mechanical control of an aircraft to control the pitch and/or roll. For example and without limitation, yoke control may alter and/or adjust the roll angle of aircraft 300 as a function of controlling and/or maneuvering ailerons. In an embodiment, pilot control 312 may include one or more footbrakes, control sticks, pedals, throttle levels, and the like thereof. In another embodiment, and without limitation, pilot control 312 may be configured to control a principal axis of the aircraft. As used in this disclosure a "principal axis" is an axis in a body representing one or more three dimensional orientations. For example, and without limitation, a principal axis can refer to a yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 300 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 300 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 3, pilot control 312 may be configured to modify a variable pitch angle. For example, and without limitation, pilot control 312 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control 312 may modify the variable pitch angle from a first angle of 2.71° to a second angle of 3.82°. Additionally or alternatively, pilot control 312 may be configured to translate a pilot desired torque for flight component 308. For example, and without limitation, pilot control 312 may translate that a pilot's desired torque for a propeller be 160 lb. ft. of torque. As a further non-limiting example, pilot control 312 may introduce a pilot's desired torque for a propulsor to be 290 lb. ft.

of torque. Additional disclosure related to pilot control 312 may be found in U.S. patent application Ser. Nos. 17/001,845 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 3, aircraft 300 may include a loading system. A loading system may include a system configured to load an aircraft of either cargo or personnel. For instance, some exemplary loading systems may include a swing nose, which is configured to swing the nose of aircraft 300 of the way thereby allowing direct access to a cargo bay located behind the nose. A notable exemplary swing nose aircraft is Boeing 747. Additional disclosure related to loading systems can be found in U.S. patent application Ser. No. 17/137,594 entitled "SYSTEM AND METHOD FOR LOADING AND SECURING PAYLOAD IN AN AIRCRAFT" by R. Griffin et al., entirety of which in incorporated herein by reference.

Still referring to FIG. 3, aircraft 300 may include a sensor 316. Sensor 316 may include any sensor or noise monitoring circuit described in this disclosure, for instance in reference to FIGS. 1-6. Sensor 316 may be configured to sense a characteristic of pilot control 312. Sensor 316 may be a device, module, and/or subsystem, utilizing any hardware, software, and/or any combination thereof to sense a characteristic and/or changes thereof, in an instant environment, for instance without limitation a pilot control 312, which the sensor is proximal to or otherwise in a sensed communication with, and transmit information associated with the characteristic, for instance without limitation digitized data. Sensor 316 may be mechanically and/or communicatively coupled to aircraft 1200, including, for instance, to at least a pilot control 312. Sensor 316 may be configured to sense a characteristic associated with at least a pilot control 312. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 316 may include at least a geospatial sensor. Sensor 316 may be located inside an aircraft; and/or be included in and/or attached to at least a portion of the aircraft. Sensor may include one or more proximity sensors, displacement sensors, vibration sensors, and the like thereof. Sensor 316 may be used to monitor the status of aircraft 300 for both critical and non-critical functions. Sensor 316 may be incorporated into vehicle or aircraft or be remote.

Still referring to FIG. 3, in some embodiments, sensor 316 may be configured to sense a characteristic associated with any pilot control described in this disclosure. Non-limiting examples of sensor 316 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 316 may sense a characteristic as an analog measurement, for instance, yielding a continuously variable electrical potential indicative of the sensed characteristic. In these cases, sensor 316 may additionally comprise an analog to digital converter (ADC) as well as any additionally circuitry, such as without limitation a Wheatstone bridge, an amplifier, a filter, and the like. For instance, in some cases, sensor 316 may comprise a strain gage configured to determine loading of one or flight components, for instance landing gear. Strain gage may be included within a circuit comprising a Wheatstone bridge, an amplifier, and a bandpass filter to provide an analog strain measurement signal having a high signal to noise ratio, which characterizes strain on a landing gear member. An ADC may then digitize analog signal produces a digital signal that can then be transmitted other systems within aircraft 300, for instance without limitation a computing system, a pilot display, and a memory component. Alternatively or additionally, sensor 316 may sense a characteristic of a pilot control 312 digitally. For instance in some embodiments, sensor 316 may sense a characteristic through a digital means or digitize a sensed signal natively. In some cases, for example, sensor 316 may include a rotational encoder and be configured to sense a rotational position of a pilot control; in this case, the rotational encoder digitally may sense rotational "clicks" by any known method, such as without limitation magnetically, optically, and the like.

Still referring to FIG. 3, electric aircraft 300 may include at least a motor 324, which may be mounted on a structural feature of the aircraft. The design of motor 324 may enable it to be installed external to a structural member (such as a boom, nacelle, or fuselage) for easy maintenance access and to minimize accessibility requirements for the structure; this may improve structural efficiency by requiring fewer large holes in the mounting area. In some embodiments, motor 324 may include two main holes in top and bottom of a mounting area to access a bearing cartridge. Further, a structural feature may include a component of electric aircraft 300. For example, and without limitation, the structural member or feature may be any portion of a vehicle incorporating motor 324, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque, or shear stresses imposed by at least propulsor 308. Persons skilled in the art, upon reviewing the entirety of this disclosure, will be aware of various materials, combinations of materials, and/or constructions techniques.

Still referring to FIG. 3, electric aircraft 300 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, or a plurality of energy sources, to power the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 3, a number of aerodynamic forces may act upon the electric aircraft 300 during flight. Forces acting on electric aircraft 300 during flight may include, without limitation, thrust, the forward force produced by the rotating element of the electric aircraft 300 and acts parallel to the longitudinal axis. Another force acting upon electric aircraft 300 may be, without limitation, drag, which may be defined as a rearward retarding force which is caused by disruption of airflow by any protruding surface of the electric aircraft 300 such as, without limitation, the wing, rotor, and fuselage. Drag may oppose thrust and acts rearward parallel to the relative wind. A further force acting upon electric aircraft 300 may include, without limitation, weight, which may include a combined load of the electric aircraft 300 itself, crew, baggage, and/or fuel. Weight may pull electric aircraft 300 downward due to the force of gravity. An additional force acting on electric aircraft 300 may include, without limitation, lift, which may act to oppose the downward force of weight and may be produced by the dynamic effect of air acting on the airfoil and/or downward thrust from the propulsor 308 of the electric aircraft. Lift generated by the airfoil may depend on speed of airflow, density of air, total area of an airfoil and/or segment thereof, and/or an angle of attack between air and the airfoil. For example, and without limitation, electric aircraft 300 is designed to be as lightweight as possible. Reducing the weight of the aircraft and designing to reduce the number of components is essential to optimize the weight. To save energy, it may be useful to reduce weight of components of electric aircraft 300, including without limitation propulsors and/or propulsion assemblies. In an embodiment, motor 324 may eliminate need for many external structural features that otherwise might be needed to join one component to another component. Motor 324 may also increase energy efficiency by enabling a lower physical propulsor profile, reducing drag and/or wind resistance. This may also increase durability by lessening the extent to which drag and/or wind resistance add to forces acting on electric aircraft 300 and/or propulsors.

Figure 4:
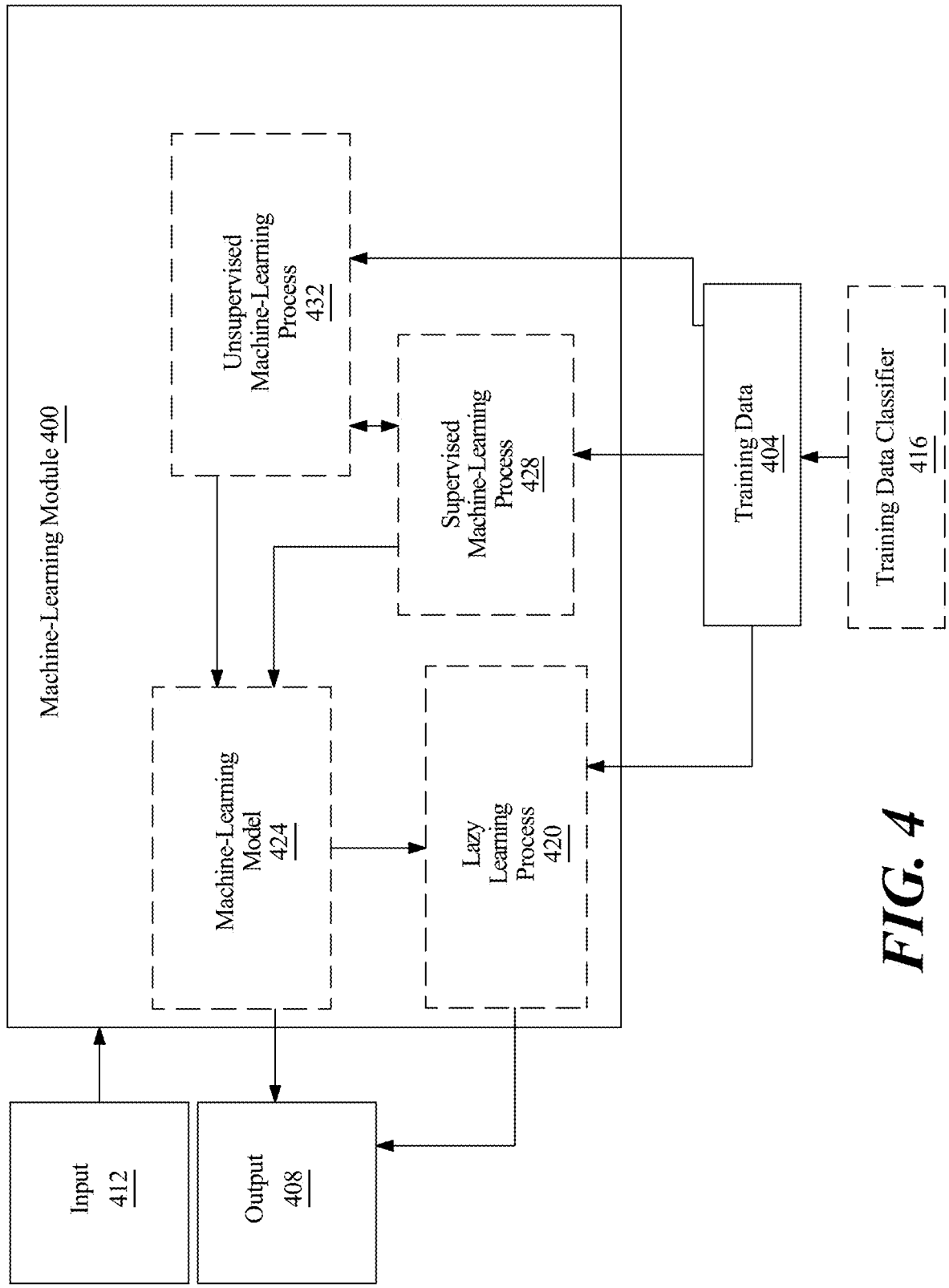
FIG. 4 is a block diagram of an exemplary machine learning model.

Referring now to FIG. 4, an exemplary embodiment of a machine-learning module 400 that may perform one or more machine-learning processes as described in this disclosure is illustrated. The machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example flight elements and/or pilot signals may be inputs, wherein an output may be an autonomous function.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. The heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, can include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; the scoring function may, for instance, seek to maximize the probability that a given input and/or combination of elements inputs is associated with a given output to minimize the probability that a given input is not associated with a given output. The scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
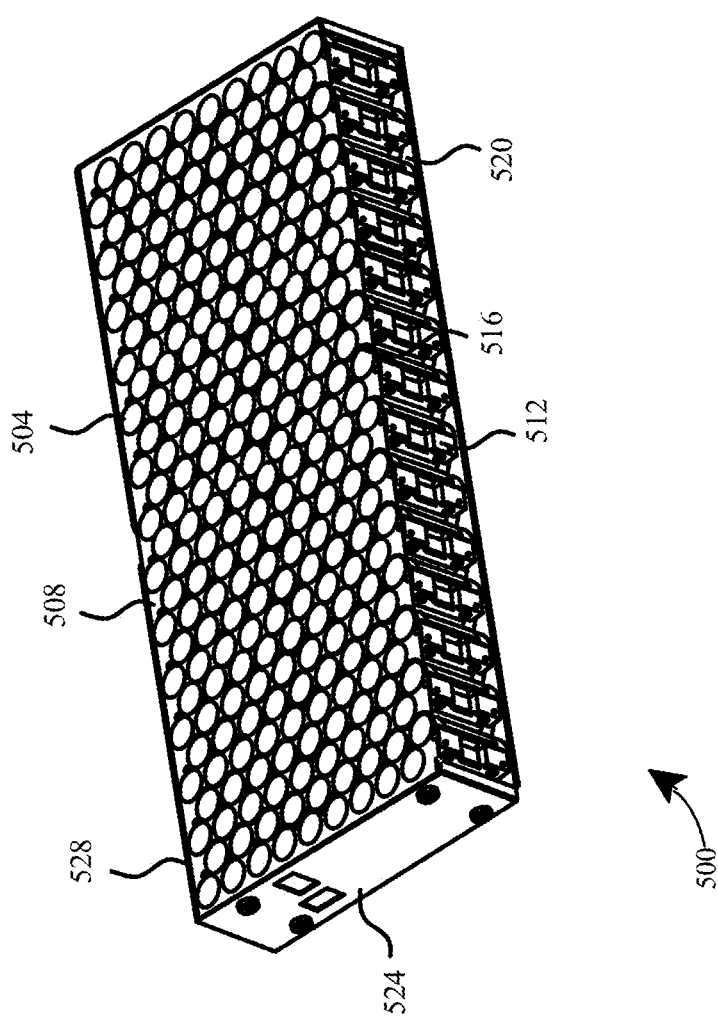
FIG. 5 is a diagram illustrating a battery module.

Referring now to FIG. 5, battery module 500 with multiple battery units 516 is illustrated, according to embodiments. Battery module 500 may comprise a battery cell 504, cell retainer 508, cell guide 512, protective wrapping, back plate 520, end cap 524, and side panel 528. Battery module 500 may comprise a plurality of battery cells, an individual of which is labeled 504. In embodiments, battery cells 504 may be disposed and/or arranged within a respective battery unit 516 in groupings of any number of columns and rows. For example, in the illustrative embodiment of FIG. 5, battery cells 504 are arranged in each respective battery unit 516 with 18 cells in two columns. It should be noted that although the illustration may be interpreted as containing rows and columns, that the groupings of battery cells in a battery unit, that the rows are only present as a consequence of the repetitive nature of the pattern of staggered battery cells and battery cell holes in cell retainer being aligned in a series. While in the illustrative embodiment of FIG. 5 battery cells 504 are arranged 18 to battery unit 516 with a plurality of battery units 516 comprising battery module 500, one of skill in the art will understand that battery cells 504 may be arranged in any number to a row and in any number of columns and further, any number of battery units may be present in battery module 500. According to embodiments, battery cells 504 within a first column may be disposed and/or arranged such that they are staggered relative to battery cells 504 within a second column. In this way, any two adjacent rows of battery cells 504 may not be laterally adjacent but instead may be respectively offset a predetermined distance. In embodiments, any two adjacent rows of battery cells 504 may be offset by a distance equal to a radius of a battery cell. This arrangement of battery cells 504 is only a non-limiting example and in no way preclude other arrangement of battery cells.

In embodiments, battery cells 504 may be fixed in position by cell retainer 508. For the illustrative purposed within FIG. 5, cell retainer 508 is depicted as the negative space between the circles representing battery cells 504. Cell retainer 508 comprises a sheet further comprising circular openings that correspond to the cross-sectional area of an individual battery cell 504. Cell retainer 508 comprises an arrangement of openings that inform the arrangement of battery cells 504. In embodiments, cell retainer 508 may be configured to non-permanently, mechanically couple to a first end of battery cell 504.

According to embodiments, battery module 500 may further comprise a plurality of cell guides 512 corresponding to each battery unit 516. Cell guide 512 may comprise a solid extrusion with cutouts (e.g. scalloped) corresponding to the radius of the cylindrical battery cell 504. Cell guide 512 may be positioned between the two columns of a battery unit 516 such that it forms a surface (e.g. side surface) of the battery unit 516. In embodiments, the number of cell guides 512 therefore match in quantity to the number of battery units 516. Cell guide 512 may comprise a material suitable for conducting heat.

Battery module 500 may also comprise a protective wrapping woven between the plurality of battery cells 504. The protective wrapping may provide fire protection, thermal containment, and thermal runaway during a battery cell malfunction or within normal operating limits of one or more battery cells 504 and/or potentially, battery module 500 as a whole. Battery module 500 may also comprise a backplate 520. Backplate 520 is configured to provide structure and encapsulate at least a portion of battery cells 504, cell retainers 508, cell guides 512, and protective wraps. End cap 524 may be configured to encapsulate at least a portion of battery cells 504, cell retainers 508, cell guides 512, and battery units 516, as will be discussed further below, end cap may comprise a protruding boss that clicks into receivers in both ends of back plate 520, as well as a similar boss on a second end that clicks into sense board. Side panel 528 may provide another structural element with two opposite and opposing faces and further configured to encapsulate at least a portion of battery cells 504, cell retainers 508, cell guides 512, and battery units 516.

Still referring to FIG. 5, in embodiments, battery module 500 can include one or more battery cells 504. In another embodiment, battery module 500 comprises a plurality of individual battery cells 504. Battery cells 504 may each comprise a cell configured to include an electrochemical reaction that produces electrical energy sufficient to power at least a portion of an electric aircraft and/or a cart 100. Battery cell 504 may include electrochemical cells, galvanic cells, electrolytic cells, fuel cells, flow cells, voltaic cells, or any combination thereof—to name a few. In embodiments, battery cells 504 may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells 504 may use the term "wired," but one of ordinary skill in the art would appreciate that this term is synonymous with "electrically connected," and that there are many ways to couple electrical elements like battery cells 504 together. As an example, battery cells 504 can be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells 504 may be wired in a series-parallel circuit which combines characteristics of the constituent circuit types to this combination circuit. Battery cells 504 may be electrically connected in any arrangement which may confer onto the system the electrical advantages associated with that arrangement such as high-voltage applications, high-current applications, or the like.

As used herein, an electrochemical cell is a device capable of generating electrical energy from chemical reactions or using electrical energy to cause chemical reactions. Further, voltaic, or galvanic cells are electrochemical cells that generate electric current from chemical reactions, while electrolytic cells generate chemical reactions via electrolysis. As used herein, the term "battery" is used as a collection of cells connected in series or parallel to each other.

According to embodiments and as discussed above, any two rows of battery cells 504 and therefore cell retainer 508 openings are shifted one half-length so that no two battery cells 504 are directly next to the next along the length of the battery module 500, which is the staggered arrangement presented in the illustrated embodiment of FIG. 5. Cell retainer 508 may employ this staggered arrangement to allow more cells to be disposed closer together than in square columns and rows like in a grid pattern. The staggered arrangement may also be configured to allow better thermodynamic dissipation, the methods of which may be further disclosed hereinbelow. Cell retainer 508 may comprise staggered openings that align with battery cells 504 and further configured to hold battery cells 504 in fixed positions. Cell retainer 508 may comprise an injection molded component. Injection molded component may comprise a component manufactured by injecting a liquid into a mold and letting it solidify, taking the shape of the mold in its hardened form. Cell retainer 508 may comprise liquid crystal polymer, polypropylene, polycarbonate, acrylonitrile butadiene styrene, polyethylene, nylon, polystyrene, polyether ether ketone, to name a few. Cell retainer 508 may comprise a second cell retainer fixed to the second end of battery cells 504 and configured to hold battery cells 504 in place from both ends. The second cell retainer may comprise similar or the exact same characteristics and functions of first cell retainer 508. Battery module 500 may also comprise cell guide 512. Cell guide 512 includes material disposed in between two rows of battery cells 504. In embodiments, cell guide 512 can be configured to distribute heat that may be generated by battery cells 504.

According to embodiments, battery module 500 may also comprise back plate 520. Back plate 520 is configured to provide a base structure for battery module 500 and may encapsulate at least a portion thereof. Backplate 520 can have any shape and includes opposite, opposing sides with a thickness between them. In embodiments, back plate 520 may comprise an effectively flat, rectangular prism shaped sheet. For example, back plate 520 can comprise one side of a larger rectangular prism which characterizes the shape of battery module 500 as a whole. Back plate 520 also comprises openings correlating to each battery cell 504 of the plurality of battery cells 504. Back plate 520 may comprise a lamination of multiple layers. The layers that are laminated together may comprise FR-4, a glass-reinforced epoxy laminate material, and a thermal barrier of a similar or exact same type as disclosed hereinabove. Back plate 520 may be configured to provide structural support and containment of at least a portion of battery module 500 as well as provide fire and thermal protection.

According to embodiments, battery module 500 may also comprise first end cap 524 configured to encapsulate at least a portion of battery module 500. End cap 524 may provide structural support for battery module 500 and hold back plate 520 in a fixed relative position compared to the overall battery module 500. End cap 524 may comprise a protruding boss on a first end that mates up with and snaps into a receiving feature on a first end of back plate 520. End cap 524 may comprise a second protruding boss on a second end that mates up with and snaps into a receiving feature on sense board.

Battery module 500 may also comprise at least a side panel 528 that may encapsulate two sides of battery module 500. Side panel 528 may comprise opposite and opposing faces comprising a metal or composite material. In the illustrative embodiment of FIG. 5, a second side panel 528 is present but not illustrated so that the inside of battery module 500 may be presented. Side panel(s) 528 may provide structural support for battery module 500 and provide a barrier to separate battery module 500 from exterior components within aircraft or environment.

Figure 6:
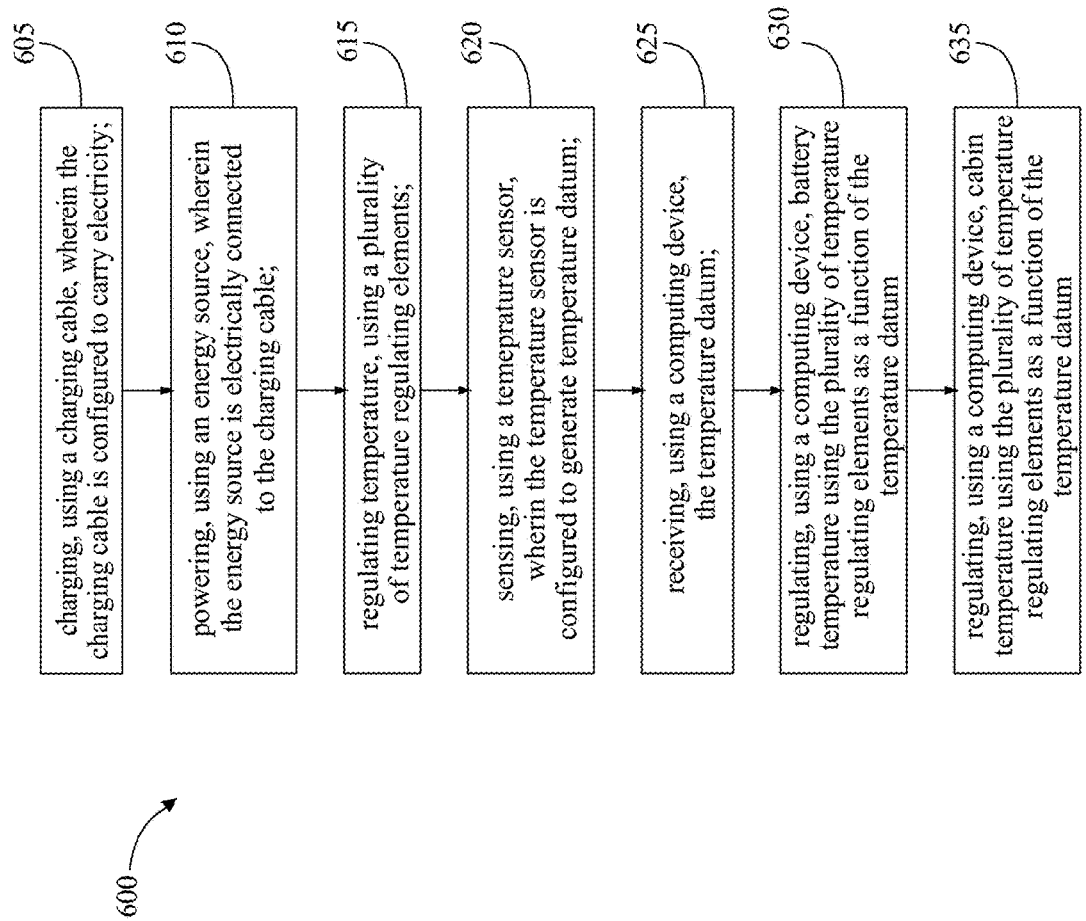
FIG. 6 is a block diagram of an exemplary method of use for an electric charging station for an electric vehicle.

Referring now to FIG. 6, an exemplary method 600 of use for electric charging station for an electric vehicle. A electric vehicle may include any vehicle described in in this disclosure, for example with reference to FIGS. 1-7. At step 605, method 600 may include charging, using a charging cable, wherein the charging cable is configured to carry electricity. A charging cable may include any cable described in in this disclosure, for example with reference to FIGS. 1-7.

With continued reference to FIG. 6, at step 610, method 600 may include powering, using an energy source, wherein the energy source is electrically connected to the charging cable. A energy source may include any energy source described in in this disclosure, for example with reference to FIGS. 1-7.

With continued reference to FIG. 6, at step 615, method 600 may include regulating temperature, using a plurality of temperature regulating elements. A temperature regulating element may include any temperature regulating element described in in this disclosure, for example with reference to FIGS. 1-7.

With continued reference to FIG. 6, at step 620, method 600 may include sensing, using a temperature sensor, wherein the temperature sensor is configured to generate temperature datum. A temperature sensor may include any sensor described in in this disclosure, for example with reference to FIGS. 1-7. A temperature datum may include any datum described in in this disclosure, for example with reference to FIGS. 1-7.

With continued reference to FIG. 6, at step 625, method 600 may include receiving, using a computing device, the temperature datum. A computing device may include any computing device described in in this disclosure, for example with reference to FIGS. 1-7.

With continued reference to FIG. 6, at step 630, method 600 may include regulating, using a computing device, battery temperature using the plurality of temperature regulating elements as a function of the temperature datum.

With continued reference to FIG. 6, at step 635, method 600 may include regulating, using a computing device, cabin temperature using the plurality of temperature regulating elements as a function of the temperature datum It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
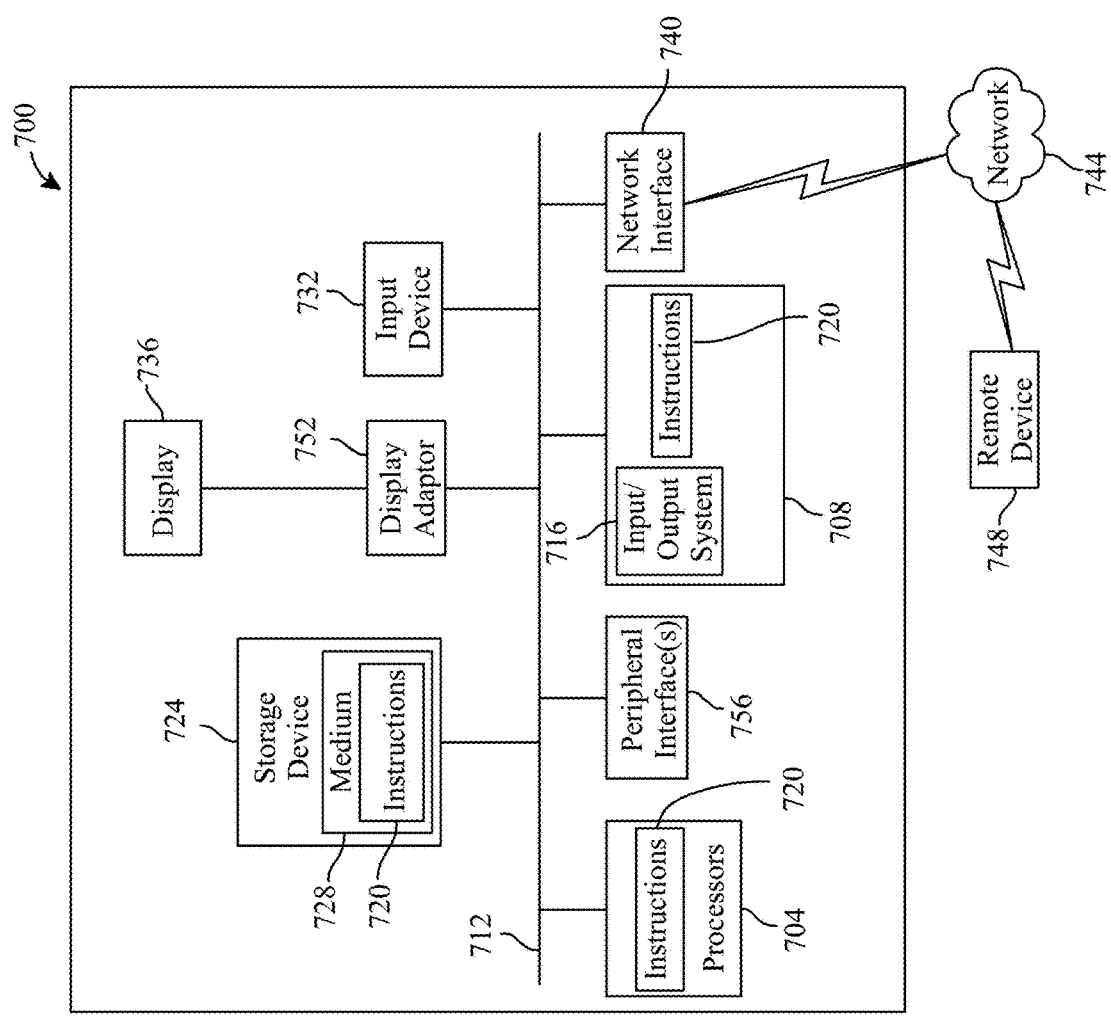
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An electric charging station for an electric aircraft, wherein the electric charging station comprises:
    a charging connector, wherein the charging connector is configured to couple with an electric vehicle port of an electric aircraft for charging a battery of the electric aircraft;
    a charging cable electrically connected to the charging connector, wherein the charging cable is configured to carry electricity;
    an energy source, wherein the energy source is electrically connected to the charging cable;
    a first fluidic connector, wherein the first fluidic connector is configured to couple with at least the electric vehicle port;
    a battery temperature regulating element thermally connected to at least the battery of the electric aircraft through at least the electric aircraft vehicle port and comprising at least a coolant flow path;
    a coolant temperature sensor, wherein the coolant temperature sensor is configured to generate a coolant temperature datum as a function of a coolant temperature; and
    a computing device communicatively connected to the battery temperature regulating element and the coolant temperature sensor, wherein the computing device is configured to:
        receive the coolant temperature datum from the coolant temperature sensor;
        regulate the coolant temperature; and
        modify a battery temperature of the battery of the electric aircraft using the battery temperature regulating element as a function of coolant flow.

2. The electric charging station of claim 1, wherein the charging station includes a cable reel module, the cable reel module comprising:
    a reel, wherein:
        the reel is rotatably mounted to the cable reel module; and
        the charging cable, in a stowed configuration, is wound around the reel; and
    a rotation mechanism, the rotation mechanism configured to drive the reel in a forward direction and a reverse direction as a function of receiving a signal from a controller.

3. The electric charging station of claim 1, the charging station further comprising a collapsible duct hose mechanically connected to the battery temperature regulating element.

4. The electric charging station of claim 1, the charging station further comprising:
- a second fluidic connector, wherein the second fluidic connector is configured to couple with at least a corresponding electric vehicle port; and
- a cabin temperature regulating element mechanically connected to the second fluidic connector.

5. The electric charging station of claim 4, wherein:
the electric charging station further comprises:
- a second coolant temperature sensor, wherein the second coolant temperature sensor is configured to generate a second coolant temperature datum representing a second coolant temperature; and the computing device is further configured to:
- regulate the second coolant temperature using the cabin temperature regulating element.

6. The electric charging station of claim 5, wherein the second coolant temperature datum comprises information on a passenger cabin temperature of a passenger cabin of the electric vehicle.

7. The electric charging station of claim 1, wherein the charging connector includes a housing configured to mate with the electric vehicle port of the electric vehicle, wherein the housing comprises a fastener for removable attachment with the electric vehicle port.

8. The electric charging station of claim 4, wherein the cabin temperature regulating element includes a heater.

9. The electric charging station of claim 1, wherein the battery temperature regulating element includes an air conditioner.

10. The electric charging station of claim 1, wherein the charging station is located proximal to a helideck.

11. A method of use of an electric charging station for an electric aircraft, wherein the method comprises:
- coupling a charging connector with an electric vehicle port of an electric aircraft for charging a battery of the electric aircraft;
- charging, using a charging cable electrically connected to an energy source and the battery of the electric aircraft, wherein the charging cable is configured to carry electricity and is electrically connected to the charging connector;
- coupling a first fluidic connector to at least the electric vehicle port;
- generating, using a first coolant temperature sensor, a first coolant temperature datum as a function of a first coolant temperature;
- receiving, using a computing device, the first coolant temperature datum from the first coolant temperature sensor;
- regulating, using the computing device, the first coolant temperature datum; and
- modifying, using the computing device, a battery temperature of the battery of the electric aircraft with a battery temperature regulating element as a function of coolant flow.

12. The method of claim 11, wherein the electric charging station includes a cable reel module, the cable reel module comprising:
- a reel, wherein:
  - the reel is rotatably mounted to the cable reel module; and
  - the charging cable, in a stowed configuration, is wound around the reel; and
- a rotation mechanism, the rotation mechanism configured to rotate the reel in a forward direction and a reverse direction as a function of receiving a signal from a controller.

13. The method of claim 11, wherein the electric charging station further comprises a collapsible duct hose mechanically connected to the battery temperature regulating element.

14. The method of claim 11, wherein the method further comprises:
- generating, using a second coolant temperature sensor, a second coolant temperature datum as a function of a second coolant temperature.

15. The method of claim 14, wherein the method further comprises:
- regulating, using the computing device, the second coolant temperature with a cabin temperature regulating element, wherein the cabin temperature regulating element is mechanically connected to a second fluidic connector.

16. The method of claim 14, wherein the second coolant temperature datum comprises information on a passenger cabin temperature of a passenger cabin of the electric vehicle.

17. The method of claim 11, wherein the charging connector includes a housing configured to mate with the electric vehicle port of the electric vehicle, wherein the housing comprises a fastener for removable attachment with the electric vehicle port.

18. The method claim 14, wherein the cabin temperature regulating element includes a heater.

19. The method of claim 11, wherein the battery temperature regulating element includes an air conditioner.

20. The method of claim 11, wherein the electric charging station is located proximal to a helideck.

* * * * *

UNITED STATES PATENT AND TRADEMARK OFFICE
CERTIFICATE OF CORRECTION

| | |
|---|---|
| PATENT NO. | : 12,227,097 B2 |
| APPLICATION NO. | : 18/130064 |
| DATED | : February 18, 2025 |
| INVENTOR(S) | : John Charles Palombini et al. |

It is certified that error appears in the above-identified patent and that said Letters Patent is hereby corrected as shown below:

On the Title Page

In Column 2, item (57), under Abstract, Line 1, delete "a" and insert -- an --, therefor.

In the Claims

In Column 38, Claim 18, Line 46, delete "method claim" and insert -- method of claim --, therefor.

Signed and Sealed this
Eighth Day of April, 2025

Coke Morgan Stewart
*Acting Director of the United States Patent and Trademark Office*